UNITED STATES PATENT OFFICE.

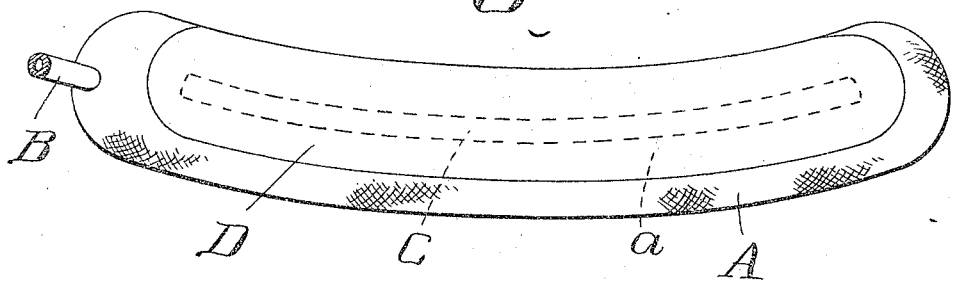
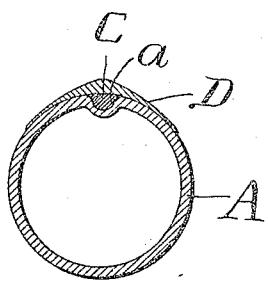
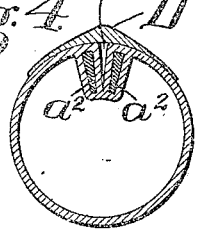
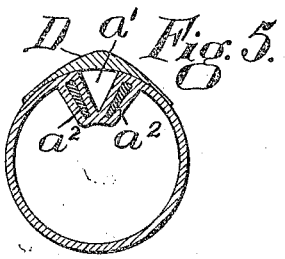
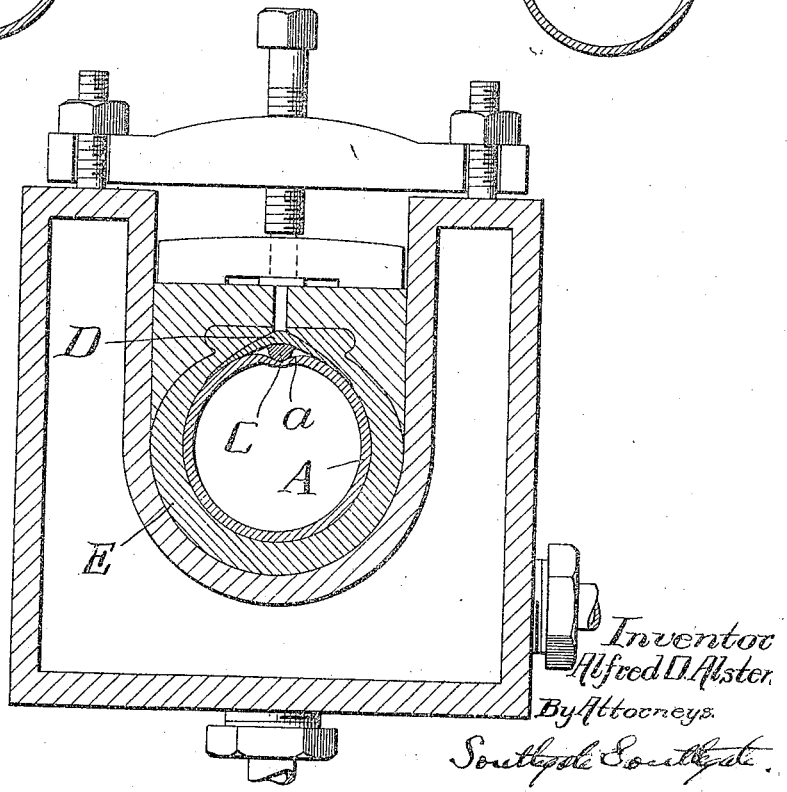

ALFRED O. ALSTEN, OF WORCESTER, MASSACHUSETTS.

PNEUMATIC VULCANIZING-CORE.

1,327,264.   Specification of Letters Patent.   Patented Jan. 6, 1920.

Application filed May 3, 1916. Serial No. 95,221.

*To all whom it may concern:*

Be it known that I, ALFRED O. ALSTEN, a subject of the King of Sweden, residing at Worcester, in the county of Worcester and State of Massachusetts, have invented a new and useful Pneumatic Vulcanizing-Core, of which the following is a specification.

This invention relates to a core for use in vulcanizing tires for repairing purposes. Heretofore these cores have been made in three forms. A soft bag made of rubber, and consequently readily destructible and never very durable, has been used alone, or such a bag or tube has been used in connection with an outer tube, of non-expansible material, usually frictioned duck or the like for the purpose of protecting the inner tube during the vulcanizing process. The third way is to use the outer tube alone, but that is open to the objection that it is not expansible so that no adequate pressure can be provided on the inside surface of the tire being repaired. The single inner tube has been objectionable on account of its lack of durability, while the double bag has been objectionable because the inner tube is likely to blow out and get injured and spoil the repairing operation.

The principal object of this invention is to provide a single tube which although expansible will not be formed of the readily destructible pure rubber gum, but can be made of durable heavy frictioned material.

Reference is to be had to the accompanying drawings in which—

Figure 1 is a perspective view of a single tube pneumatic core constructed in accordance with this invention;

Fig. 2 is a transverse sectional view of the same at the center showing it in its non-expanded condition;

Fig. 3 is a similar view showing it in its expanded condition in a vulcanizing mold, and Figs. 4 and 5 are transverse sections of a modification.

The pneumatic core is shown in the drawings in the form of a single tube A composed of one or more layers of frictioned duck or other rubberized fabric lined with rubber which is flexible but not materially expansible and which will stand the degree of heat necessary for repeated vulcanization. It is preferably formed of the material usually used for the outer tube. It consists of a single tube closed at all points except that at the end it receives a supply tube B through which it is inflated in any ordinary way.

For the purpose of rendering expansible this core, which as has been stated is formed of non-expansible material, it is provided with a longitudinal depression *a* preferably along the concave side thereof. This depression is formed in the molding operation and its walls are composed also of frictioned duck or other rubberized textile material so that it, itself, is not expansible, but it is preferred to make it more flexible than the rest of the walls of the core. For this purpose it is shown somewhat thinner and having a higher percentage of rubber, but care is taken that it shall not be expansible.

Although the bag made as so far described will accomplish the purposes of this invention by itself I prefer to provide a solid hard core C in the depression or groove *a* preferably filling the same when the bag is deflated and formed of wood, gutta percha, or the like. Over this I prefer to place a strip D which can be secured at its ends or one of them to the end of the core A. This strip can be formed of frictioned duck or other desired material, and is designed for forming the core walls at the inner or upper part of that mold as shown in Fig. 3.

In the use of the device the core with these parts in position and entirely deflated is introduced into the mold inside of the outer tube E to be repaired. When the mold is all ready air is pumped into it and this has the effect of straightening out the walls of the depression *a* as indicated more clearly in Fig. 3. In this way the bag, which is formed entirely of substantially non-expansible material, is expanded and the pressure of air is transmitted to the interior surface of the tire being vulcanized. In this way all the advantages of the ordinary pure rubber single tube bag are retained and also the advantages of the more durable outer tube. The object of the core C will now be seen. It is simply to hold the strip D up against the inside of the tube and enable it to shape the inner surfaces of the concave side, but it can be dispensed with under certain circumstances if desired.

The above description applies specifically to the preferred construction shown in the first three figures. In Figs. 4 and 5 I have shown a form in which the groove $a'$ is V-shaped and its flat sides are stiffened by rigid pieces of gutta percha, wood, or other material $a^2$. In this case no core as C is needed but strip D is used. The parts move from the condition shown in Fig. 4 to that shown in Fig. 5 upon inflation, and the results are similar to those above specified.

Although I have illustrated and described only two embodiments of the invention I am aware of the fact that other modifications can be made therein by any person skilled in the art without departing from the scope of the invention as expressed in the claims.

Therefore I do not wish to be limited to all the details of construction herein shown and described, but what I do claim is:—

1. As an article of manufacture, a single tube pneumatic vulcanizing core formed of substantially non-expansible material having a hinge-like connection longitudinally thereof to permit bodily expansion thereof.

2. As an article of manufacture, a single tube pneumatic vulcanizing core formed entirely of substantially non-expansible but flexible material and having means whereby when inflated its diameter will be increased, said means embodying a flexible joint extending longitudinally of the tube whereby the tube may be bodily expanded notwithstanding the fact that it is made of non-expansible material.

3. As an article of manufacture, a pneumatic vulcanizing core formed mainly of flexible rubberized textile material and provided with a groove or depression when deflated capable of straightening out in a transverse direction so as to allow the diameter of the bag to increase when inflated.

4. As an article of manufacture, a pneumatic vulcanizing core comprising flexible frictioned material and provided with a groove or depression located longitudinally and extending substantially the whole length of the bag on the concave side capable of straightening out in a transverse direction so as to increase the diameter of the bag when inflated.

5. As an article of manufacture, a pneumatic vulcanizing core formed of substantially non-expansible but flexible material and provided with a groove or depression when deflated capable of straightening out in a transverse direction so as to increase the diameter of the bag when inflated, the walls of said groove being formed of non-expansible material of a more flexible character than the main walls of the bag.

6. As an article of manufacture, a pneumatic vulcanizing core formed of substantially non-expansible but flexible material and provided with a groove or depression when deflated capable of straightening out in a transverse direction so as to increase the diameter of the bag when inflated, and a core normally lying in said groove but separate from the bag.

7. As an article of manufacture, a pneumatic vulcanizing core formed of substantially non-expansible but flexible material and provided with a groove or depression when deflated capable of straightening out in a transverse direction so as to increase the diameter of the bag when inflated, a core normally lying in said groove but separate from the bag, and a strip of flexible material covering said core and the groove and supported by the core for engaging the interior of the tire being vulcanized.

8. As an article of manufacture, a pneumatic vulcanizing core formed of substantially non-expansible but flexible material and provided with a groove or depression when deflated capable of straightening out in a transverse direction so as to increase the diameter of the bag when inflated, and a strip of material covering said groove both in its expanded and non-expanded condition to engage the interior of the tire to be vulcanized.

9. As an article of manufacture, a single-tube pneumatic vulcanizing core formed of substantially non-stretchable material but capable of body expansion by reason of the provision of a flexible joint running longitudinally along the concave side of the core and a strip extending longitudinally along the core and bridging said joint and adapted to bear against the inner faces of the side walls of the tire when the tube is inflated, for the purpose set forth.

In testimony whereof I have hereunto set my hand.

ALFRED O. ALSTEN.